United States Patent [19]

Fima

[11] 3,942,027
[45] Mar. 2, 1976

[54] INTERNALLY MOUNTED BATTERY JUMP CABLES

[76] Inventor: Raoul Fima, 4711 St. Joseph Creek, Lisle, Ill. 60532

[22] Filed: May 24, 1974

[21] Appl. No.: 472,996

[52] U.S. Cl............................................. 307/10 R
[51] Int. Cl.² ........................................ H02G 3/00
[58] Field of Search...... 307/10 R, 10 BP; 180/82 R

[56] References Cited
UNITED STATES PATENTS 3,090,871   5/1963   Gorman ........................... 307/10 R Primary Examiner—Herman J. Hohauser
Attorney, Agent, or Firm—Edmond T. Patnaude

[57] ABSTRACT

A set of electric terminals are mounted in a vehicle near the end thereof opposite to the end where the battery is located and are connected internally of the vehicle to the battery terminals thereby to permit jumping of the battery from either the front or rear end of the vehicle.

3 Claims, 3 Drawing Figures

INTERNALLY MOUNTED BATTERY JUMP CABLES

The present invention generally relates to a method and a means for jumping the battery of an automobile, and it relates more particularly to the provision of a set of terminals connected internally of the vehicle to the battery terminals and mounted near the end of the automobile opposite to the end where the battery is located.

BACKGROUND OF THE INVENTION

Automobiles of the present vintage generally include an engine compartment in which the battery is mounted. In most cars, the engine compartment is at the front of the vehicle although in some cases the engine compartment is at the rear. When the battery becomes discharged it is common practice to start the engine by connecting jumper cables from the terminals of the discharged battery to the terminals of a charged battery in another automobile. Since most automobiles have the battery located at the front of the vehicle the usual practice is to drive the front end of the operative vehicle up to the front end of the inoperative vehicle. Otherwise, extremely long jumper cables are required and, for the most part, the emergency jumper cables now in use would not be sufficiently long to make the necessary connections. Many serious accidents have occurred on highways where an operative vehicle has attempted to make a U-turn on the highway or has parked along the side of the inoperative vehicle during an emergency battery jumping operation.

SUMMARY OF THE INVENTION

In accordance with the teachings of the present invention an additional set of electric terminals are provided in the compartment at the end of the vehicle opposite to the engine compartment and these auxiliary terminals are connected to the battery terminals by high current capacity conductors so that when a battery jumping operation is to be performed it is simply necessary for the operative vehicle to drive up in the normal manner to the rear of the inoperative vehicle. The short distance between the battery terminals of the operative vehicle and the auxiliary battery terminals of the inoperative vehicle makes it possible to use jumber cables of conventional length to make the necessary connections between the auxiliary terminals of one vehicle and the battery terminals of the other.

BRIEF DESCRIPTION OF THE DRAWINGS

Further objects and advantages and a better understanding of the present invention can be had by reference to the following description, wherein.

DETAILED DESCRIPTION OF THE DRAWINGS

Figure 1:
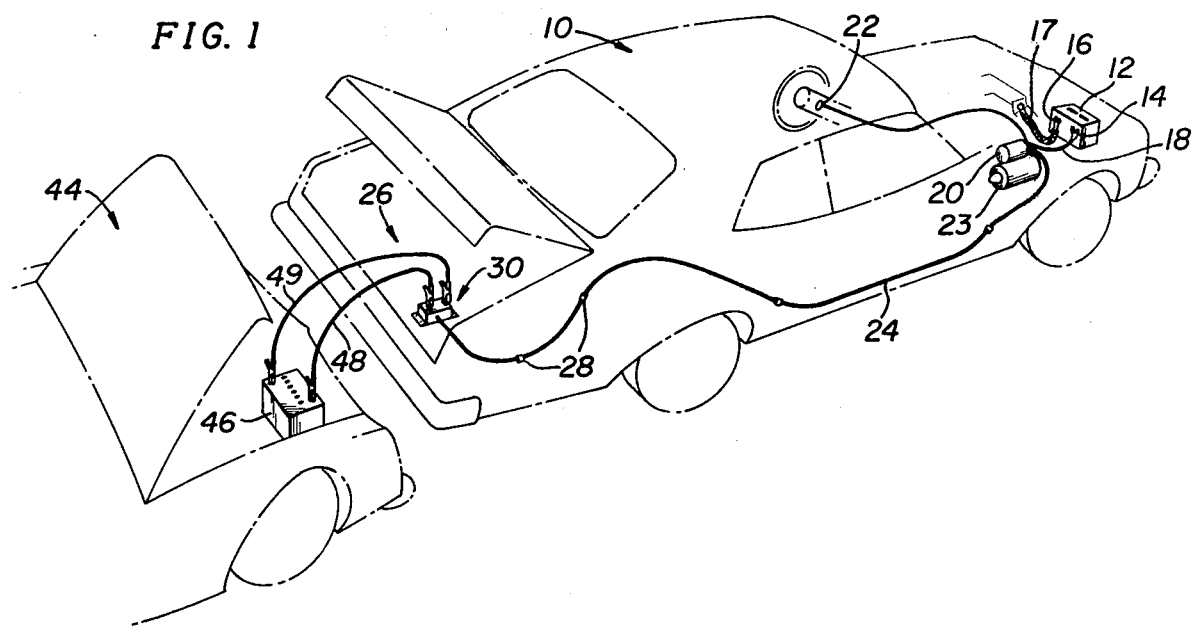
FIG. 1 is a perspective view of an automobile, shown in phantom, in which the system of the present invention is installed.

Referring now to the drawings and particularly to FIG. 1 thereof, an automobile 10 has a forward engine compartment located beneath the hood and in which is mounted a battery 12 having positive and negative terminals 14 and 16 respectively. The negative terminal 16 is suitably connected by means of a cable 17 to the engine or frame of the vehicle. The positive terminal 14 is connected via a cable 18 to a relay 20 which upon actuation of the combination ignition and starter switch 22 on the steering post in the driver compartment connects the terminal 14 to the starter motor 23 thereby to crank over the engine.

Figure 2:
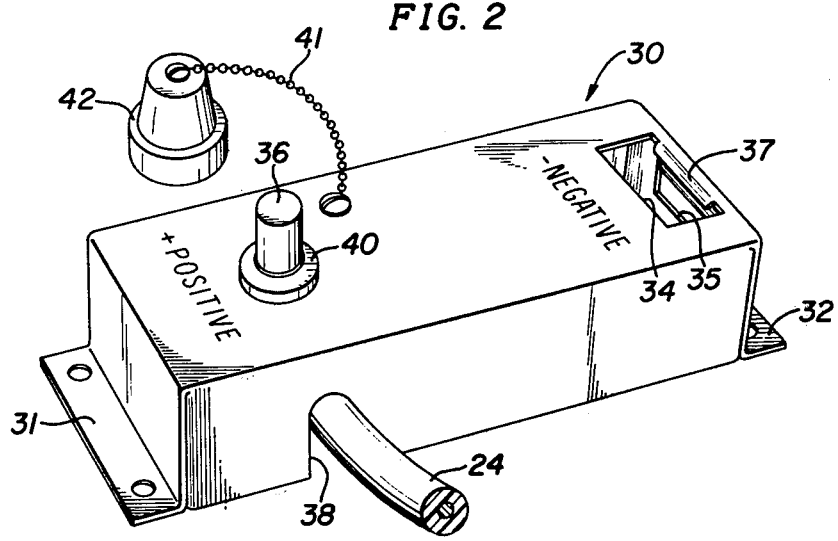
FIG. 2 is a perspective view of an auxiliary terminal box used in the system of FIG. 1.

In accordance with the present invention a high current capacity insulated conductor 24 is connected to the cable 18 at the location of the relay 20 and extends along the underside of the body of the vehicle 10 to the trunk compartment 26 at the rear. The conductor 24 is attached by a plurality of mounting clips 28 to the body of the vehicle in any suitable manner. Fixedly mounted within the trunk compartment at one side thereof is an auxiliary battery terminal box 30 best shown in FIG. 2, suitably formed of sheet metal and having a pair of mounting flanges 31 and 32 at the ends thereof. The flanges 31 and 32 are suitably apertured for receiving mounting bolts or sheet metal screws for attaching the box 30 to the floor of the trunk compartment to provide a good electric connection between the box 30 and the body and frame of the vehicle. A pair of apertures 34 an 35 are struck out from the top and side of the box and the intermediate corner edges are bent inwardly to provide a ground terminal connection 33 to which a jumper cable alligator clip may be connected. A positive terminal post 36 is mounted to and insulated from the top wall of the box in a suitable manner and is connected within the box to the cable 28 which extends through an opening 38 in the side of the box. The top of the box 30 is embossed with the terms "+ POSITIVE" and "− NEGATIVE" adjacent the terminals 36 and 37 respectively. An insulating ring 40, formed of plastic, is mounted to the top of the cover 30 over the terminal 46 and an insulating plastic cap 42 is adapted to be snap-fitted thereon to insulate the terminal 36 from the ambient when the system is not in use. For convenience, a flexible chain 44 is connected between the cap 42 and the box 30 to prevent loss of the cap 42. If desired, a threaded connection may be provided between the cap 42 and the ring 40 to insure against spureous removal of the cap 42.

Figure 3:
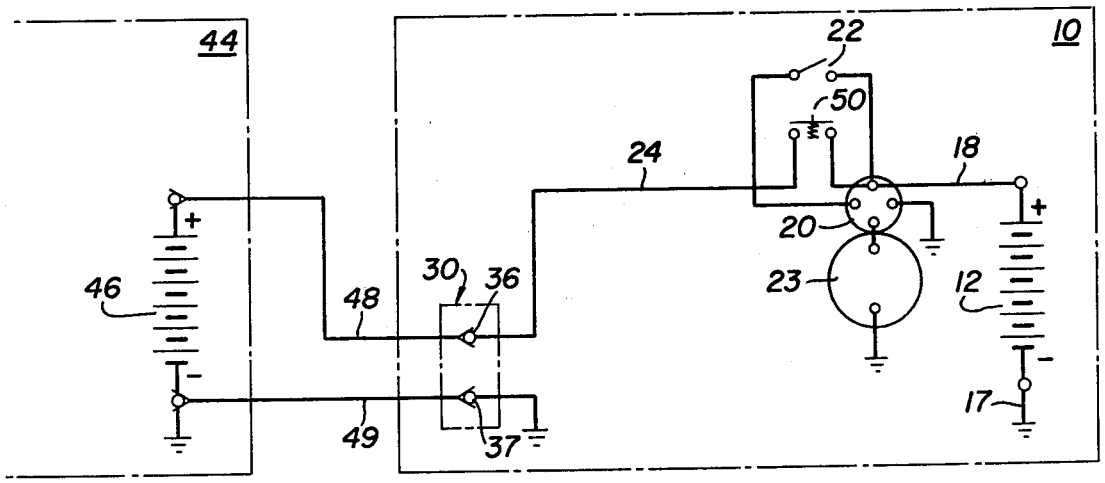
FIG. 3 is a schematic diagram of the electric circuit of the system of the present invention.

In FIG. 3, there is shown the schematic circuit diagram of the electric system illustrated in FIG. 1. In addition, however, an auxiliary switch 50 is connected in the line 24. When the switch is open the auxiliary terminal 36 is disconnected from the battery 12. Preferably the switch 50 is spring biased into an open position for safety reasons. The switch 50 may be located in either the engine or trunk compartments of the vehicle 10 or it may be located on the floor of the driver compartment or in proximity to the steering wheel for actuation by the driver as he starts the vehicle during a jump operation.

OPERATION

When the battery 12 is discharged to the extent that it cannot provide the necessary power to start the engine of the vehicle 10, another vehicle 44 having a sufficiently charged battery 46 is driven up to the rear end of the vehicle 10 and a jumper cable 48 is connected between the negative terminal of the battery 46 and the terminal 37 on the box 30 in the trunk of the vehicle 10. A second jumper cable 49 is then connected between the auxiliary positive terminal 36 and the positive terminal of the battery 46. The battery 46 is thus connected in parallel with the battery 12 and the vehicle 10 can then be started in the normal manner by actuation of the combination ignition and starter switch 22. If the safety switch 50 is incorporated in the system it must be closed during the starting operation.

When the system of the present invention is to be used in a vehicle having the engine and battery compartment at the rear it will be understood by those skilled in the art that the auxiliary terminal box 30 is mounted in the forward trunk compartment of the vehicle and connected in the same manner to the battery at the rear. Moreover, if desired the insulated conductor 24 may be connected directly to the positive terminal of the battery 12 although, in most cases, it is more convenient to connect it to the positive terminal of the relay switch.

While the present invention has been described in connection with a particular embodiment thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. In an automobile having a first compartment and a second compartment spaced from said first compartment, an engine and a battery for turning over and starting said engine, said battery having a pair of terminals and being mounted in said first compartment with one terminal thereof connected to the frame of said automobile, the combination comprising
    a terminal box mounted in said second compartment,
    a first electric terminal carried by said box and electrically connected to the frame of said automobile,
    a second electric terminal carried by said box and insulated from said first electric terminal,
    said first and second electric terminals being adapted to be gripped by the terminals of a pair of jumper cables for respective electrical connection to said cables,
    an insulated conductor connected between the other of said battery terminals and said second electric terminal,
    said insulated conductor providing a permanent connection between said second electric terminal and said other battery terminal and having sufficient current carrying capacity to turn over said engine.

2. The combination according to claim 1 wherein said terminal box is formed of metal and is electrically connected to the frame of said automobile.

3. The combination according to claim 2 comprising a cover removably positioned over said second electric terminal.

* * * * *